United States Patent
Yatoh et al.

[11] Patent Number: 5,558,726
[45] Date of Patent: Sep. 24, 1996

[54] COLD ROLLED STEEL HAVING EXCELLENT MACHINABILITY AND PRODUCTION THEREOF

[75] Inventors: Hisayoshi Yatoh; Yasuhiko Yamashita; Takashi Harabuchi; Seinosuke Yano, all of Kitakyusyu, Japan

[73] Assignees: Nippon Steel Corporation; Japan Casting & Forging Corporation, both of Tokyo, Japan

[21] Appl. No.: 481,426

[22] PCT Filed: Oct. 18, 1994

[86] PCT No.: PCT/JP94/01752

§ 371 Date: Jun. 14, 1995

§ 102(e) Date: Jun. 14, 1995

[87] PCT Pub. No.: WO95/11320

PCT Pub. Date: Apr. 27, 1995

[30] Foreign Application Priority Data

Oct. 18, 1993 [JP] Japan ................................. 5-260247

[51] Int. Cl.$^6$ ................................. C22C 38/14; C21D 8/04
[52] U.S. Cl. ........................... 148/328; 148/547; 148/603
[58] Field of Search ..................................... 148/328, 330, 148/547, 603

[56] References Cited

U.S. PATENT DOCUMENTS 5,123,969  6/1992  Chou ........................................ 148/328

FOREIGN PATENT DOCUMENTS

| 44-18066 | 8/1969 | Japan . |
| 53-12899 | 5/1978 | Japan . |
| 57-26124 | 2/1982 | Japan . |
| 63-45322 | 2/1988 | Japan . |
| 3-54186 | 8/1991 | Japan . |
| 3-267321 | 11/1991 | Japan . |
| 4-292352 | 10/1992 | Japan . |
| 6-136482 | 5/1994 | Japan . |

*Primary Examiner*—Deborah Yee
*Attorney, Agent, or Firm*—Kenyon & Kenyon

[57] ABSTRACT

This invention aims at obtaining a cold steel sheet having excellent cold formability irrespective of a high N content in order to re-utilize a scrap steel generated from scraps. A steel sheet comprising not greater than 0.1% of C, 60 to 150 ppm of N, not greater than 0.4% of Mn satisfying the relation Mn/S≧7, not greater than 0.030% of S, not greater than 0.1% of Al and not greater than 0.08% of Ti satisfying the relation N (%)—Ti/3.42 (%)≦0.007, wherein the size of TiN in the weight at least ½ of the total TiN weight is 0.05 to 10 μm, is obtained. When production is made by continuous annealing, Ti is added so as to satisfy the relation N (%)—Ti/3.42 (%)≦0.004% and furthermore, high temperature winding is effected in hot rolling or B is added.

When production is made by box annealing, the Ti content is adjusted so as to satisfy the relation 0.002%≦N (%)—Ti/3.42 (%)≦0.007%, a slab heating temperature is set to a higher temperature and the winding temperature of a hot rolled sheet is set to a lower temperature.

7 Claims, 3 Drawing Sheets

COLD ROLLED STEEL HAVING EXCELLENT MACHINABILITY AND PRODUCTION THEREOF

TECHNICAL FIELD

This invention is directed to remelting of scrap material by an electric furnace, etc., for re-utilizing scrap steel which has been remarkably increasing in recent years from automobile scrap, and so forth. More particularly, the present invention relates to a cold rolled steel sheet having excellent cold formability, though it has a high N content, and to a production method of such a cold rolled steel sheet.

BACKGROUND ART

Recently, quality of a cold rolled steel sheet for forming and its production technologies have made remarkable progress, and particularly, a Rankford value (hereinafter referred to as the "r value") representing deep drawability when cold has become as high as 1.7 or more.

As a technology for obtaining such high performance, Japanese Examined Patent Publication (Kokoku) No. 44-18066 discloses a technology which fixes and stabilizes C by adding 0.02 to 0.5% of Ti to a steel containing 0.001 to 0.02% of C and not greater than 0.015% of O.

Japanese Examined Patent Publication (Kokoku) No. 3-54186 discloses a method which reduces both C and N contents to at most 0.005% and adds Ti and Nb, and Japanese Examined Patent Publication (Kokoku) No. 53-12899 discloses a technology which minimizes the C and N contents and adds Ti, Nb and B for fixing them.

These prior art technologies are based on the common technical concept of reducing the C and N contents as much as possible and obtain a cold rolled steel sheet having excellent non-ageability and excellent cold formability.

Re-utilization of steel scrap which is generated in large quantities everywhere has become a very important problem at present. To re-utilize the scrap, it is common to arc melt the scrap by an electric furnace, or the like. In this case, the N content in the steel reaches a high level of 60 ppm or more because $N_2$ in the air comes into the steel.

When the N content is great, formability drops remarkably. Particularly in a high nitrogen region having an N content of 60 ppm or more, forming involving large deformation such as deep drawing becomes hardly possible. Means such as vacuum degassing must be employed in order to reduce this nitrogen content, and the production cost unavoidably increases.

Japanese Unexamined Patent Publication (Kokai) No. 57-26124 can be cited as a prior art reference which discloses a production technology of a cold rolled steel sheet having a high N content. This technology continuously anneals a cold rolled steel sheet having a specific C, Mn and Al content and containing 30 to 200 ppm of N at a predetermined temperature, and obtains a cold rolled steel sheet having excellent bake-hardenability. Because this cold rolled steel sheet contains a large quantity of N, a content of free N (the balance obtained by subtracting N bonded to Ti, Nb, etc., from the total N content) can be secured. This free N exhibits bake-hardenability. This reference discloses also that when this steel sheet is allowed to contain P, Si and Ti, its strength can also be improved. Nonetheless, Japanese Unexamined Patent Publication (Kokai) No. 57-26124 does not at all disclose a technology for securing formability of a high N steel.

As means for solving this problem, the inventors of the present invention invented, and filed a patent application for, a high N content hot rolled steel sheet having high strength and high formability and a production technology thereof in Japanese Patent Application No. 4-292352. This reference allows a high N (50 to 150 ppm) steel to contain C so that the carbon equivalent becomes 0.1 to 0.45%, secures an area fraction of pearlite of at least 5% so as to secure uniform elongation after cold forming, and disperses TiN of which sizes 1 μm or more in a weight proportion of 0.0008 to 0.015% so as to obtain a hot rolled steel sheet having a tensile strength of 34 kgf/mm² or more.

However, this reference does not at all suggest formability of a high N cold rolled steel sheet.

When re-utilizing a scrap and using an electric furnace for this re-utilization, the present invention provides a cold rolled steel sheet having excellent formability, though it has a high N content, and a production method which does not require processing such as vacuum degassing.

CONSTITUTION OF INVENTION

The inventors of the present invention have examined the components of a steel, its crystal structure, the forms of precipitates (kind, amount, distribution condition) and mechanical properties of the steel sheet after cold rolling and annealing.

First of all, the experimental results which have resulted in completion of the present invention will be explained.

An Al killed steel was produced by using an electric furnace. Because it was possible to predict in advance that the N content became high, Ti was added so as to fix N and to make it harmless. Steel components in the ladle were 302 ppm of C, 0.009% of Si, 0.163% of Mn, 0.005% of P, 0.0118% of S, 0.0319% of Al, 122 ppm of N, 0.029% of Ti (free N of 37 ppm when Ti is added), 0.015% of Cr, 0.016% of Cu and 0.026% of Ni.

This steel was cast and hot rolled, cold rolled and annealed under various conditions, then various properties thereof (yield point, tensile strength, elongation, r value) were examined.

More concretely, a wide variety of properties could be obtained such as a steel sheet having good formability with a yield point of 16 to 18 kgf/mm², a tensile strength of 30 to 32 kgf/mm², elongation of 44 to 46% and an r value of 1.7 to 1.8 or a steel sheet having very poor formability with a yield point of 18 to 25 kgf/mm², a tensile strength of 37 to 39 kgf/mm², elongation of 36 to 38% and an r value of 1.4 to 1.5.

On the assumption that variance of these properties was primarily associated with the quantities of the precipitates consisting principally of TiN and their forms (size, dispersion state), the inventors of this invention changed the cooling rate (to various values between 10° C./min and 82° C./min) at the time of casting and examined the relation between the mechanical properties of the steel sheet after annealing and the quantity and form of TiN. In addition, a material having the same components but having a low N content of 26 ppm (hereinafter called the "corresponding material") was treated by the same process, and similar examinations were carried out.

Incidentally, the heating temperature of the slab was 1,200° C., the hot rolling temperature was 880° C., the thickness of the hot rolled sheet was 3.5 mm, the thickness of the cold rolled sheet was 0.8 mm (reduction ratio: 88%)

and the continuous annealing condition was at 820° C. for one minute.

Inspection of dozens of fields per sample was carried out for inclusions such as TiN, etc., by using an electronmicroscope, and the size distribution of TiN and the weight distribution on the basis of the former were determined. FIGS. 1(A), 1(B), 1(C) and 1(D) show the relation between the cooling rate at the time of casting and the form of TiN (abscissa) and the resulting material properties (ordinate).

Since the shape of the precipitate of TiN is substantially square, the length d of one of its sides is used as the size of TiN, and this size of TiN was classified into a group less than 0.05 μm (hereinafter called the "A rank"), a group of 0.05 to 10 μm (hereinafter called the "B rank") and a group exceeding 10 μm (hereinafter called the "C rank"), and the proportion of each rank was displayed by wt %.

In the drawing, when the cooling rate at the time of casting was great (82° C./min), both yield point and tensile strength became great while the r value was extremely small, and cold forming was extremely difficult. TiN at this time was all in the A rank. As the cooling rate at the time of casting was decreased (38° C./min), the yield point and the tensile strength gradually dropped while the elongation and the r value increased, so that cold machinability was improved. When the cooling rate at the time of casting was further lowered (7° C./min), the yield point increased somewhat, the tensile strength dropped somewhat, and the elongation as well as the r value dropped. In conjunction with the size distribution of TiN, good machinability could not be obtained when the size of the A rank was too great or when the size of the C rank was too great, and formability equivalent to that of the corresponding material could be obtained when the size of the B rank was at least 50%.

The reasons are assumed as follows. When the cooling rate at the process of casting is high, TiN below 0.05 μm finely precipitates, impedes the grain growth at the time of annealing and provides the action of precipitation hardening. As a result, elongation or the r value is remarkably deteriorated. When the cooling rate at the process of casting is low, on the other hand, a large amount of TiN exceeding 10 μm precipitates, and cracks occur from such great inclusions in the cast.

Figure 1A:
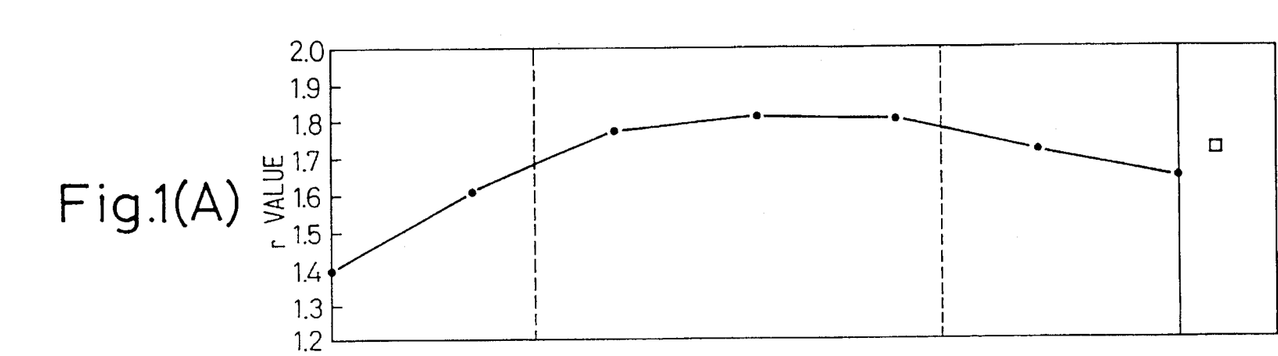
FIGS. 1(A), 1(B), 1(C) and 1(D) are diagrams showing the relationship between the weight % of classified size of TiN and material properties.
Figure 1B:
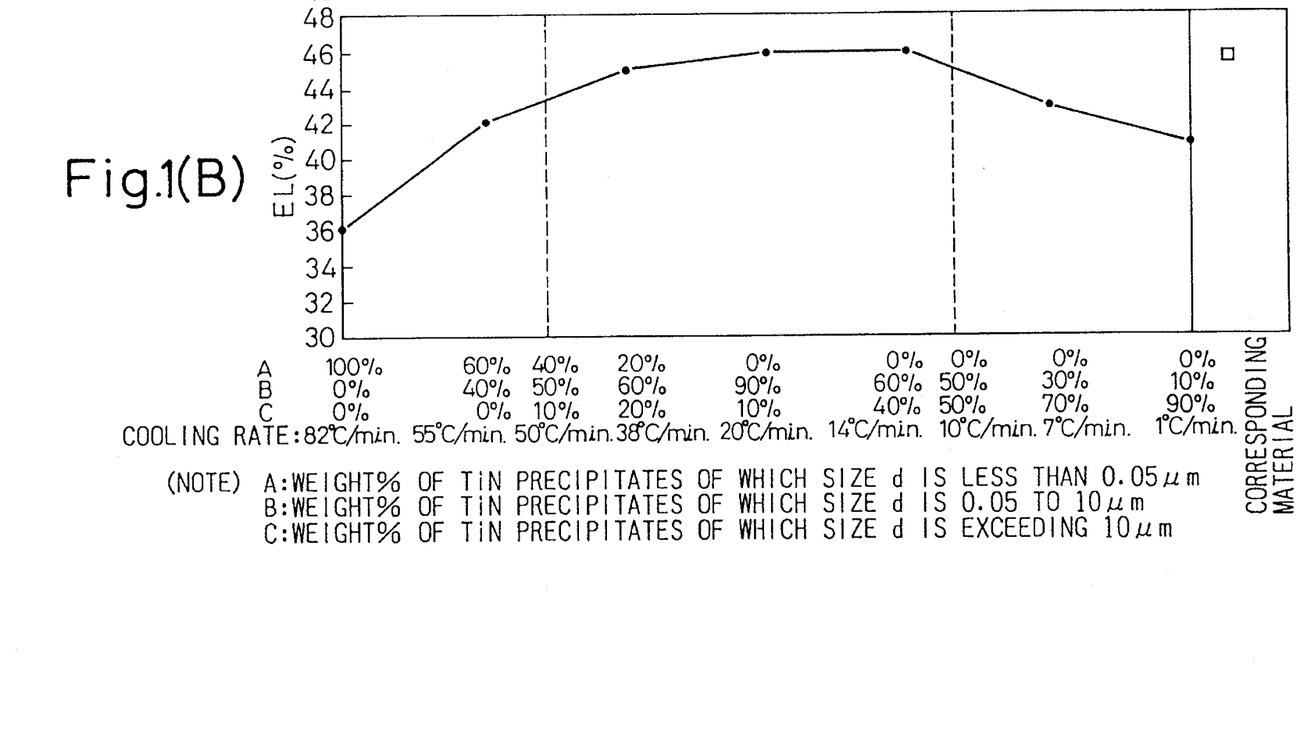
Figure 1C:
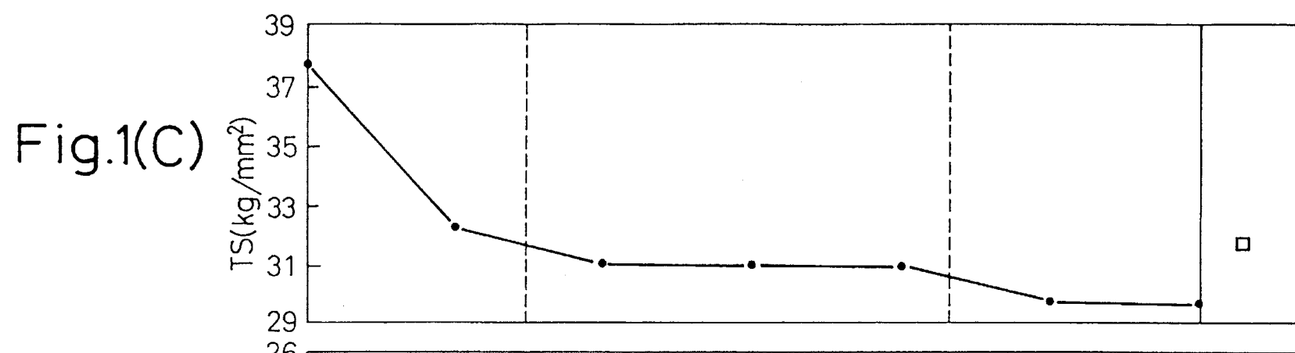
Figure 1D:
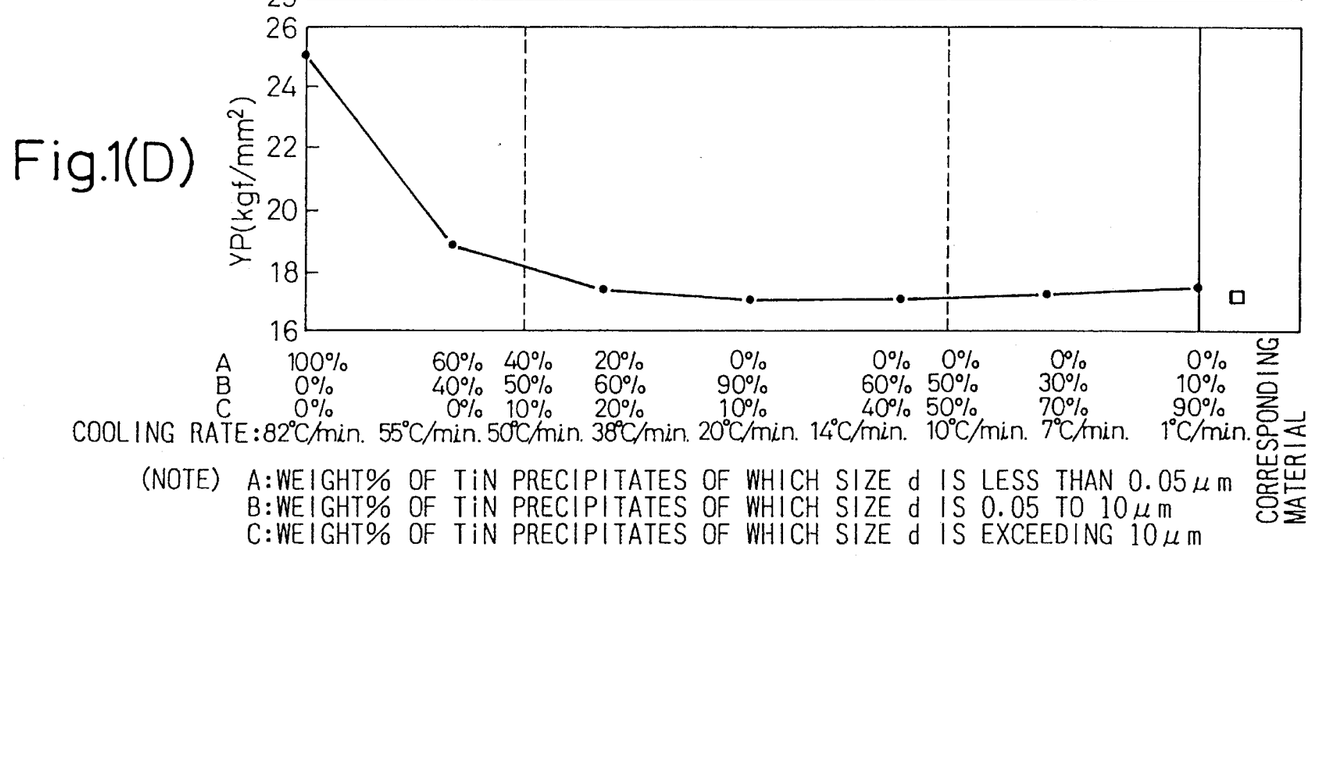
Figure 2:
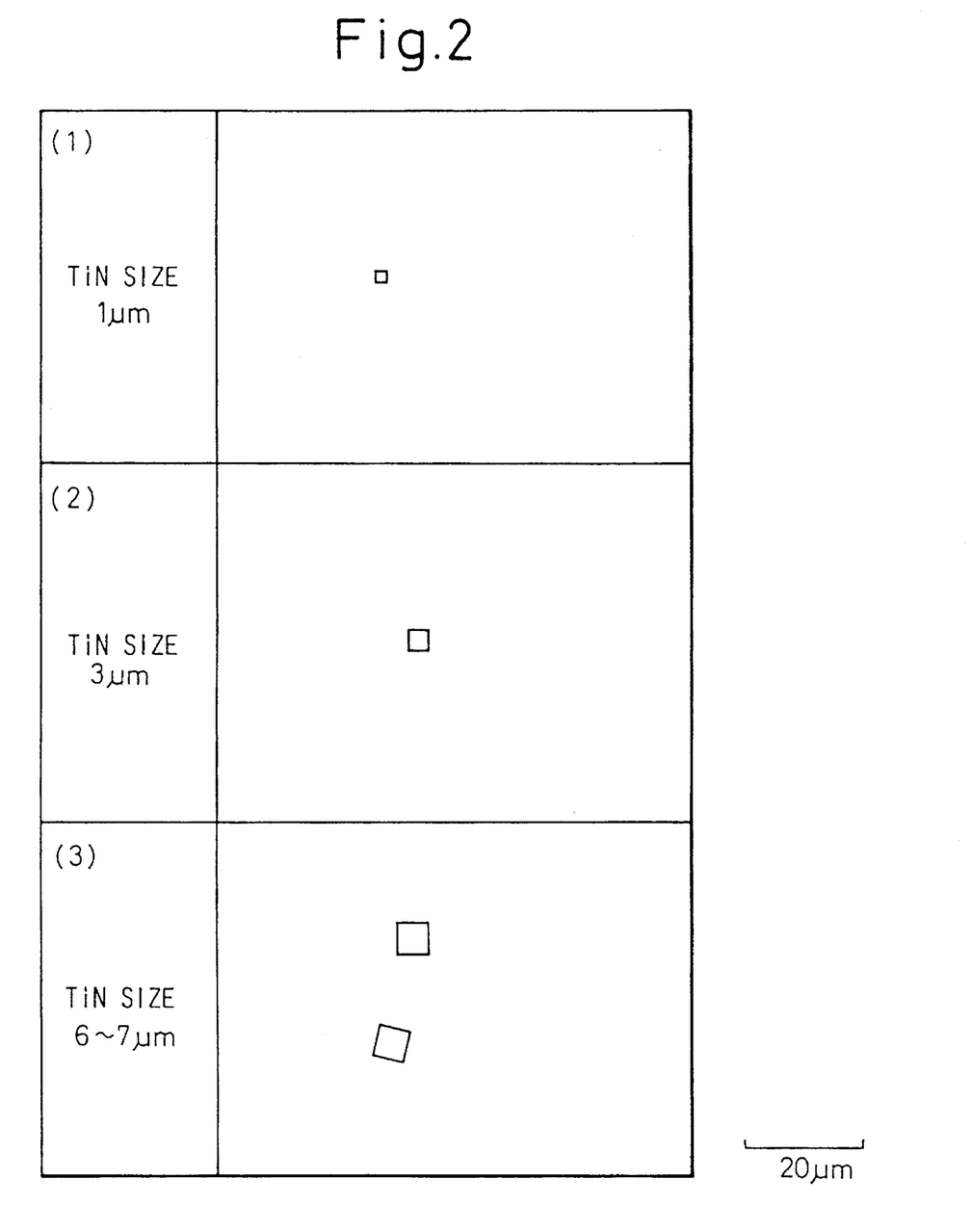
FIG. 2 is a diagram showing an example of measurement of the size of TiN.

Accordingly, elongation is mainly deteriorated. FIG. 2 shows a sketch of TiN measured by an electron microscope. Item (1) described in FIG. 2 shows an example when the size d is about 1 μm, item (2) described in FIG. 2 shows an example when the size d is about 3 μm and item (3) described in FIG. 2 shows an example when d is from about 6 to about 7 μm.

In other words, in order to obtain a cold rolled sheet having high formability from the starting material having a high N content, the present invention forms TiN by adding Ti, makes N harmless by limiting a free N quantity, and drastically improves the mechanical properties such as the yield point, the tensile strength, the r value, etc., by stipulating the size of TiN in a predetermined range.

Accordingly, the product according to the present invention is a cold rolled steel sheet containing not greater than 0.1% of C, 0.0060 to 0.0150% of N, not greater than 0.4% of Mn which also satisfies the relation Mn/S≧7, not greater than 0.030% of S, not greater than 0.1% of Al, not greater than 0.08% of Ti which also satisfies the relation Ti:N (%)—Ti/3.42 (%)≦0.0070, in terms of weight percentage (wt %), and the balance consisting of Fe and unavoidable impurities, wherein the cold rolled steel sheet comprises a texture in which TiN having a size of 0.05 to 10 μm (by measurement through an electron microscope) is precipitated in weight at least ½ of the TiN total weight.

To obtain such a cold rolled steel sheet, a molten steel having the chemical components described above is cooled at a temperature in the range of the solidifying point to 600° C. at a rate of 10 to 50° C./min to produce a slab, and after this slab is heated, it is hot rolled. Then, the resulting hot rolled sheet is taken up at a temperature of not lower than 700° C. and is cold rolled. Thereafter, continuous annealing is carried out. Incidentally, when box annealing of the cold rolled sheet is carried out, the slab is heated at a temperature not lower than 1,130° C., and after hot rolling, the sheet is wound at a temperature not higher than 650° C.

When continuous annealing is carried out, Ti is added in such an amount that free N in the slab is below 0.0040%, and when box annealing is carried out, free N falls within the range of 0.0020 to 0.0070%. To fix N, B may be added, whenever necessary.

BEST MODE FOR CARRYING OUT THE INVENTION

Hereinafter, the best mode for carrying out the present invention will be described in detail.

First, the reasons for limitation of the chemical components in the present invention will be explained.

Since C improves the strength of the steel but lowers its cold formability (elongation, drawability), its upper limit is set to 0.1%. Preferably, the upper limit is not greater than 0.05%.

In order to make S harmless, Mn is added in such an amount as to satisfy at least the relation Mn/S≧7. However, when Mn is added in an excessive amount, it deteriorates formability (elongation, deep drawability). Accordingly, the upper limit is set to 0.4%.

S induces red heat brittleness during hot rolling and causes the occurrence of cracks. Therefore, its upper limit is set to 0.03%.

Al is the element which is added for deoxidation and for fixing N which has not been fixed and made harmless by Ti. However, the addition of Al in a great amount lowers elongation, and the upper limit is therefore set to 0.1%, and the lower limit is set to 0.005%. The object described above cannot be accomplished when the amount is less than this lower limit value.

N is a detrimental element for formability, but its whole amount need not be fixed by Ti and be made harmless. However, the amount of free N which is not fixed by Ti must be stipulated.

In other words, the formula N (%)—Ti/3.42 (%) must be not greater than 0.0070%. When the value exceeds 0.0070%, the precipitation quantity of AlN for fixing excessive free N becomes great, and the grain growth at the process of annealing is impeded. Accordingly, elongation and the r value drop.

As described above, Ti is added so as to fix N and to make it harmless, but an amount satisfying at least the relation N (%)—Ti/3.42 (%)≦0.0070% is necessary. However, excessive Ti bonds with C and TiC precipitates if the amount of addition is too great. In such a case, elongation and the r value become deteriorated. Accordingly, the upper limit is set to 0.08%.

B combines with N and forms BN, and provides the effect of preventing the precipitation of AlN. In the production method by continuous annealing, the precipitation state of AlN is susceptible to the influences of the temperature history at hot rolling, and results in variance of properties. To avoid this problem, high temperature winding is preferably carried out in hot rolling. The addition of B can solve this problem, and a cold rolled steel sheet having excellent deep drawability can be produced by continuous annealing without effecting high temperature winding.

The addition of B in this case is $1.0 \leq 1.3 \times B$ (%)/(N (%)—Ti (%)/3.42)$\leq 1.5$. In other words, the relation $1.3 \times B$ (%)/(N (%)—Ti (%)/3.42) represents the atomic ratio of B and free N, and when this value is greater than 1.0, high temperature winding can be omitted. When B is added in an amount exceeding 1.5 times the amount of free N, elongation and the r value drop. Therefore, the amount should be limited to not greater than 1.5 times.

In the present invention, the steel substantially comprises Fe with the exception of the components described above, and the steel may contain unavoidable elements which mix from the molten raw materials such as the scrap.

Next, the production condition will be described.

The molten steel having the components described above is poured into a casting machine such as a continuous casing machine and is cooled to produce a slab. In this case, cooling is carried out at a cooling rate of 10 to 50° C./min within a temperature range of the solidifying point to 600° C. The size of TiN in an amount at least ½ of the total weight is made to 0.05 to 10 μm by this cooling.

Next, after being heated within an ordinary temperature range, the slab is hot rolled. The hot rolling condition is not particularly limited, but in order to obtain a cold rolled steel sheet having high deep drawability by the continuous annealing process, a winding temperature is within the range of not lower than 700° C. In this case, free N (N (%)—Ti/3.42 (%)) is not greater than 0.0040%. For, when free N is below 0.0040%, N is fixed as AlN and is rendered harmless.

In order to particularly secure deep drawability for the steel sheet produced by the continuous annealing process, it is preferred to limit the free N amount to a low level (because the AlN formation time is short) and to precipitate in advance N as AlN by high temperature winding. Further, massing and granulation of the carbides are simultaneously effected by high temperature winding.

Incidentally, when B is added as described above, precipitation of AlN is not necessary, and high temperature winding of the hot rolled sheet can be omitted.

To obtain a cold rolled steel sheet having high deep drawability by the box annealing process, the heating temperature of the slab is set to at least 1.130° C., and the winding temperature is set to be not greater than 650° C. In this case, N (%)—Ti/3.42 (%) must be from 0.0020 to 0.0070%. In other words, to secure deep drawability for the rolled sheet by the box annealing process, a minimum 0.0020% of free N is allowed to remain and AlN is allowed to precipitate during the annealing process so that the texture structure can be improved by using this AlN, unlike the case of the production of the rolled sheet by continuous annealing. Accordingly, the slab is heated at a high temperature of at least 1,130° C. so as to cause complete solid solution of AlN, and low temperature winding of the hot rolled sheet is carried out so as not to allow AlN to precipitate before the annealing step.

The cold rolling condition is not particularly limited, and ordinary rolling is carried out to obtain a desired sheet thickness.

Although the present invention has been completed on the basis of the cold rolled steel sheet, this technology can also be applied to surface treated steel sheets for containers, for construction and for automobiles as will be represented by the following examples.

EXAMPLES

Example 1

Steels having the components tabulated in Table 1 were hot rolled, cold rolled and annealed under the condition tabulated in Table 2. The properties obtained in this instance were also tabulated in Table 2.

Experiment No. 6 represents the case where free N exceeded the upper limit of claim 1 and elongation was inferior. Experiments Nos. 9 and 10 represent the cases where the sizes of TiN were too great and elongation was also inferior. Experiments Nos. 11 and 12 represent the cases where the sizes of TiN were too small, so that the yield strength was excessively high and elongation was low.

Steels Nos. 1, 2, 3, 4, 5, 7 and 8 as the steel of the present invention provided excellent properties (yield strength, tensile strength, elongation, r value).

TABLE 1

| No. | C ppm | Si × $10^{-3}$% | Mn × $10^{-3}$% | P × $10^{-3}$% | S ppm | Al × $10^{-3}$% | N ppm | Ti × $10^{-3}$% | Free N* ppm | TiN** Form | Remarks |
|---|---|---|---|---|---|---|---|---|---|---|---|
| 1 | 302 | 9 | 163 | 5 | 118 | 32 | 122 | 29 | 37 | a | This invention |
| 2 | 413 | 25 | 210 | 8 | 161 | 55 | 102 | 32 | 8 | a | This invention |
| 3 | 501 | 16 | 222 | 6 | 144 | 60 | 82 | 20 | 24 | a | This invention |
| 4 | 355 | 10 | 188 | 8 | 142 | 54 | 140 | 25 | 67 | a | This invention |
| 5 | 401 | 8 | 155 | 5 | 149 | 35 | 122 | 49 | −21 | a | This invention |
| 6 | 415 | 8 | 170 | 6 | 135 | 70 | 90 | — | 90 | — | Comp. Example |
| 7 | 310 | 9 | 165 | 6 | 121 | 35 | 118 | 29 | 33 | a | This invention |
| 8 | 310 | 9 | 165 | 6 | 121 | 35 | 118 | 29 | 33 | a | This invention |
| 9 | 410 | 13 | 199 | 6 | 142 | 44 | 109 | 27 | 30 | b | Comp. Example |
| 10 | 410 | 13 | 199 | 6 | 142 | 44 | 109 | 27 | 30 | b | Comp. Example |
| 11 | 330 | 15 | 188 | 7 | 151 | 46 | 139 | 37 | 31 | c | Comp. Example |
| 12 | 330 | 15 | 188 | 7 | 151 | 46 | 139 | 37 | 31 | c | Comp. Example |

*Free N: total N − Ti/3.42

TABLE 1-continued

| No. | C ppm | Si × $10^{-3}$% | Mn × $10^{-3}$% | P × $10^{-3}$% | S ppm | Al × $10^{-3}$% | N ppm | Ti × $10^{-3}$% | Free N* ppm | TiN** Form | Remarks |
|---|---|---|---|---|---|---|---|---|---|---|---|

**TiN form: (a) 0.05 μm ≤ TiN size ≤ 10 μm was at least 50% of the total amount (b) 10 μm < TiN size was at least 50% of the total amount (c) TiN size < 0.05 μm was at least 50% of the total amount
The underline represents the portions outside the range of the present invention.

TABLE 2

| | Processing Condition | | | | | | | |
|---|---|---|---|---|---|---|---|---|
| | Hot Rolling Condition | | | Cold Rolling Condition | | | | |
| No. | Slab Heating Temp. °C. | Winding Temp. °C. | Thickness of Hot Rolled Sheet mm | Reduction ratio % | Thickness of cold rolled sheet mm | Annealing Condition System | Cycle | Skin Pass Rolling % |
| 1 | 1250 | 550 | 3.0 | 73 | 0.8 | Box | 680° C. × 14 H | 1.2 |
| 2 | 1150 | 750 | 3.5 | 77 | 0.8 | Con. | 820° C. × 1 min. | 1.0 |
| 3 | 1250 | 550 | 3.0 | 73 | 0.8 | Box | 680° C. × 14 H | 1.2 |
| 4 | 1250 | 550 | 3.0 | 73 | 0.8 | Box | 680° C. × 14 H | 1.2 |
| 5 | 1150 | 750 | 3.5 | 77 | 0.8 | Con. | 820° C. × 1 min. | 1.0 |
| 6 | 1250 | 550 | 3.0 | 73 | 0.8 | Box | 680° C. × 14 H | 1.2 |
| 7 | 1250 | 550 | 3.0 | 73 | 0.8 | Box | 680° C. × 14 H | 1.2 |
| 8 | 1150 | 750 | 3.5 | 77 | 0.8 | Con. | 820° C. × 1 min. | 1.0 |
| 9 | 1250 | 550 | 3.0 | 73 | 0.8 | Box | 680° C. × 14 H | 1.2 |
| 10 | 1150 | 750 | 3.5 | 77 | 0.8 | Con. | 820° C. × 1 min. | 1.0 |
| 11 | 1250 | 550 | 3.0 | 73 | 0.8 | Box | 680° C. × 14 H | 1.2 |
| 12 | 1150 | 750 | 3.5 | 77 | 0.8 | Con. | 820° C. × 1 min. | 1.0 |

| | Properties | | | | |
|---|---|---|---|---|---|
| No. | Yield strength kgf/mm$^2$ | Tensile strength kgf/mm$^2$ | Elongation % | $\bar{r}$ Value | This invention or Comp. Example |
| 1 | 17.1 | 31.0 | 46 | 1.81 | This invention |
| 2 | 18.1 | 31.5 | 45 | 1.78 | This invention |
| 3 | 17.2 | 30.8 | 46 | 1.83 | This invention |
| 4 | 18.4 | 31.9 | 43 | 1.71 | This invention |
| 5 | 18.9 | 32.4 | 42 | 1.67 | This invention |
| 6 | 19.7 | 33.4 | 38 | 1.52 | Comp. Example |
| 7 | 17.3 | 31.0 | 46 | 1.79 | This invention |
| 8 | 17.5 | 30.7 | 46 | 1.81 | This invention |
| 9 | 17.5 | 29.8 | 41 | 1.66 | Comp. Example |
| 10 | 17.8 | 30.2 | 40 | 1.70 | Comp. Example |
| 11 | 25.1 | 37.7 | 36 | 1.39 | Comp. Example |
| 12 | 25.4 | 38.0 | 35 | 1.42 | Comp. Example |

Annealing System
Con.: Continuous annealing
Box: Box annealing
$\bar{r}$ Value = $(r_L + r_C + 2r_D)/4$ Example 2

Steels having higher Ti contents as shown in Table 3 were hot rolled, cold rolled and annealed under the condition tabulated in Table 4. The properties of the resulting steel sheets were also tabulated in Table 4.

In Experiment No. 14, the Ti amount exceeded the upper limit stipulated in the claims, and the other components and the production condition were the same as those of Experiment No. 13. In comparison with Experiment No. 13 wherein the Ti amount was within the range of the present invention, both elongation and the r value were lower.

TABLE 3

| No. | C ppm | Si × $10^{-3}$ % | Mn × $10^{-3}$ % | P × $10^{-3}$ % | S ppm | Al × $10^{-3}$ % | N ppm | Ti × $10^{-3}$ % | Free N* ppm | TiN** Form | Remarks |
|---|---|---|---|---|---|---|---|---|---|---|---|
| 13 | 318 | 9 | 203 | 5 | 240 | 44 | 148 | 74 | −68 | a | This invention |
| 14 | 318 | 9 | 203 | 5 | 240 | 44 | 148 | 92 | −121 | a | This invention |

*Free N: total N - Ti/3.42
**TiN form: (a) 0.05 μm ≦ TiN size ≦10 μm was at least 50% of the tatal amount (b) 10 μm < TiN size was at least 50% of the total amount (c) TiN size <0.05 μm was at least 50% of the total amount
The underline represents the portions outside the range of the present invention

TABLE 4

| | Processing Condition | | | | | | |
|---|---|---|---|---|---|---|---|
| | Hot Rolling Condition | | | Cold Rolling Condition | | | |
| No. | Slab Heating Temp. °C. | Winding Temp. °C. | Thickness of Hot Rolled Sheet mm | Reduction ratio % | Thickness of cold rolled sheet mm | Annealing Condition System / Cycle | Skin Pass Rolling % |
| 13 | 1150 | 750 | 3.5 | 77 | 0.8 | Con. / 820° C. × 1 min. | 1.0 |
| 14 | 1150 | 750 | 3.5 | 77 | 0.8 | Con. / 820° C. × 1 min. | 1.0 |

| | Properties | | | | |
|---|---|---|---|---|---|
| No. | Yield strength kgf/mm² | Tensile strength kgf/mm² | Elongation % | $\bar{r}$ Value | This invention or Comp. Example |
| 13 | 22.4 | 34.2 | 39 | 1.65 | This invention |
| 14 | 27.2 | 38.6 | 35 | 1.48 | Comp. Example |

Annealing System
Con.: Continuous annealing
Box: Box annealing
$\bar{r}$ Value = $(r_L + r_C + 2r_D)/4$

Example 3

B-containing steels having the components shown in Table 5 were hot rolled, cold rolled and annealed under the condition tabulated in Table 6. The properties obtained at this time are also tabulated in Table 6.

All of the steels were within the range of the present invention and exhibited excellent properties. However, the winding temperature of the hot rolled sheet in Experiment No. 17 was below the lower limit of claim 5 stipulating the condition for obtaining a steel sheet having excellent deep drawability by continuous annealing, and its yield point was somewhat higher while the r value was somewhat lower than those of Experiment No. 16 satisfying the condition of claim 5.

In Experiment No. 15 in which B was added, properties substantially equivalent to those of Experiment No. 16, wherein the winding temperature of the hot rolled sheet was within the range of claim 5, could be obtained even when the hot rolled sheet was taken up at a winding temperature below the lower limit of claim 5. In other words, it corresponded to claim 6, and a steel sheet having excellent deep drawability could be obtained by continuous annealing without limiting the winding temperature of the hot rolled sheet, by the addition of B.

TABLE 5

| No. | C ppm | Si × $10^{-3}$ % | Mn × $10^{-3}$ % | P × $10^{-3}$ % | S ppm | Al × $10^{-3}$ % | N ppm | Ti × $10^{-3}$ % | B ppm | Free N* ppm | TiN** Form | Remarks |
|---|---|---|---|---|---|---|---|---|---|---|---|---|
| 15 | 432 | 9 | 237 | 19 | 125 | 35 | 111 | 31 | 17 | 20 | a | This invention addition B |
| 16 | 432 | 9 | 237 | 19 | 125 | 35 | 111 | 31 | 17 | 20 | a | This invention addition B |

TABLE 5-continued

| No. | C ppm | Si × 10−3 % | Mn × 10−3 % | P × 10−3 % | S ppm | Al × 10−3 % | N ppm | Ti × 10−3 % | B ppm | Free N* ppm | TiN** Form | Remarks |
|---|---|---|---|---|---|---|---|---|---|---|---|---|
| 17 | 302 | 9 | 163 | 5 | 118 | 32 | 122 | 29 | — | 37 | a | This invention without addition B |

*Free N: total N − Ti/3.42
**TiN form: (a) 0.05 μm ≦ TiN size ≦ 10 μm was at least 50% of the total amount (b) 10 μm < TiN size was at least 50% of the total amount (c) TiN size <0.05 μm was at least 50% of the total amount
The underline represents the portions outside the range of the present invention

TABLE 6

| | Processing Condition | | | | | | |
|---|---|---|---|---|---|---|---|
| | Hot Rolling Condition | | | Cold Rolling Condition | | | |
| No. | Slab Heating Temp. °C. | Winding Temp. °C. | Thickness of Hot Rolled Sheet mm | Reduction ratio % | Thickness of cold rolled sheet mm | Annealing Condition System / Cycle | Skin Pass Rolling % |
| 15 | 1150 | 630 | 3.5 | 77 | 0.8 | Con. 820° C. × 1 min. | 1.0 |
| 16 | 1150 | 750 | 3.5 | 77 | 0.8 | Con. 820° C. × 1 min. | 1.0 |
| 17 | 1150 | 630 | 3.5 | 77 | 0.8 | Con. 820° C. × 1 min. | 1.0 |

| | Properties | | | | |
|---|---|---|---|---|---|
| No. | Yield strength kgf/mm² | Tensile strength kgf/mm² | Elongation % | r̄ Value | This invention or Comp. Example |
| 15 | 17.8 | 32.7 | 45 | 1.68 | This invention |
| 16 | 17.4 | 32.3 | 46 | 1.70 | This invention |
| 17 | 20.2 | 33.9 | 42 | 1.51 | This invention |

Annealing System
Con.: Continuous annealing
Box: Box annealing
r̄ Value = $(r_L + r_C + 2r_D)/4$

Example 4

Steels having the components shown in Table 7 were hot rolled, cold rolled and annealed under the condition tabulated in Table 8, and surface treatment was carried out. Properties obtained in these cases were also tabulated in Table 8.

The steel sheets according to the present invention exhibited good formability even after the surface treatment.

By the way, a plating quantity as 20 g/m² for one surface in the case of electrogalvanizing, 50 g/m² for one surface in the case of lead plating, and 20 g/m² for one surface in the case of electrogalvanizing with an organic coating, and in this case, an organic coating having a thickness of 0.8 μm was applied on the plating.

TABLE 7

| No. | C ppm | Si × 10−3 % | Mn × 10−3 % | P × 10−3 % | S ppm | Al × 10−3 % | N ppm | Ti × 10−3 % | B ppm | Free N* ppm | TiN** Form | Remarks |
|---|---|---|---|---|---|---|---|---|---|---|---|---|
| 18 | 302 | 9 | 163 | 5 | 118 | 32 | 122 | 29 | — | 37 | a | This invention |
| 19 | 302 | 9 | 163 | 5 | 118 | 32 | 122 | 29 | — | 37 | a | This invention |
| 20 | 302 | 9 | 163 | 5 | 118 | 32 | 122 | 29 | — | 37 | a | This invention |
| 21 | 432 | 9 | 237 | 19 | 125 | 35 | 111 | 31 | 17 | 20 | a | This invention |
| 22 | 302 | 9 | 163 | 5 | 118 | 32 | 122 | 29 | — | 37 | a | This invention |

TABLE 7-continued

| No. | C ppm | Si × 10−3 % | Mn × 10−3 % | P × 10−3 % | S ppm | Al × 10−3 % | N ppm | Ti × 10−3 % | B ppm | Free N* ppm | TiN** Form | Remarks |
|---|---|---|---|---|---|---|---|---|---|---|---|---|
| 23 | 302 | 9 | 163 | 5 | 118 | 32 | 122 | 29 | — | 37 | a | This invention |

*Free N: total N − Ti/3.42
**TiN form: (a) 0.05 μm ≦ TiN size ≦ 10 μm was at least 50% of the tatal amount (b) 10 μm < TiN size was at least 50% of the total amount (c) TiN size < 0.05 μm was at least 50% of the total amount
The underline represents the portions outside the range of the present invention

TABLE 8

| | Processing Condition | | | | | | | |
|---|---|---|---|---|---|---|---|---|
| | Hot Rolling Condition | | | Cold Rolling Condition | | | | |
| No. | Slab Heating Temp. °C. | Winding Temp. °C. | Thickness of Hot Rolled Sheet mm | Reduction Ratio % | Thickness of cold rolled sheet mm | Annealing Condition System | Annealing Condition Cycle | Skin Pass Rolling % | Surface Treatment |
| 18 | 1250 | 550 | 3.0 | 73 | 0.8 | Box | 680° C. × 14 H | 1.2 | EG |
| 19 | 1150 | 750 | 3.5 | 77 | 0.8 | Con. | 810° C. × 1 min. | 1.0 | EG |
| 20 | 1250 | 550 | 3.0 | 73 | 0.8 | Box | 680° C. × 14 H | 1.2 | TC |
| 21 | 1150 | 750 | 3.5 | 77 | 0.8 | Con. | 810° C. × 1 min. | 1.0 | TC |
| 22 | 1250 | 550 | 3.0 | 73 | 0.8 | Box | 680° C. × 14 H | 1.2 | WU |
| 23 | 1150 | 750 | 3.5 | 77 | 0.8 | Con. | 820° C. × 1 min. | 1.0 | WU |

| | Properties | | | | |
|---|---|---|---|---|---|
| No. | Yield strength kgf/mm² | Tensile strength kgf/mm² | Elongation % | $\bar{r}$ Value | This invention or Comp. Example |
| 18 | 17.2 | 29.7 | 46 | 1.82 | This invention |
| 19 | 18.3 | 31.2 | 45 | 1.73 | This invention |
| 20 | 18.1 | 31.1 | 46 | 1.79 | This invention |
| 21 | 18.5 | 31.8 | 45 | 1.75 | This invention |
| 22 | 17.1 | 30.1 | 46 | 1.76 | This invention |
| 23 | 17.5 | 30.6 | 45 | 1.73 | This invention |

Annealing System
Con: Continuous annealing
Box: Box annealing
Surface Treatment
EG: electrogalvanizing
TC: lead plating
WU: electrogalvanizing with organic coating Example 5

Steels having the components shown in Table 9 were hot rolled, cold rolled and annealed under the condition tabulated in Table 10, and molten zinc plating was carried out. Properties obtained in these cases were also tabulated in Table 10.

The steel sheets according to the present invention exhibited excellent properties even after the molten zinc plating treatment. By the way, the plating quantity of molten zinc plating was 100 g/m² per surface.

TABLE 9

| No. | C ppm | Si × 10−3 % | Mn × 10−3 % | P × 10−3 % | S ppm | Al × 10−3 % | N ppm | Ti × 10−3 % | B ppm | Free N* ppm | TiN** Form | Remarks |
|---|---|---|---|---|---|---|---|---|---|---|---|---|
| 24 | 501 | 12 | 222 | 6 | 144 | 60 | 82 | 24 | — | 12 | a | Thia invention |
| 25 | 432 | 9 | 237 | 19 | 125 | 35 | 111 | 31 | 17 | 20 | a | This invention |

TABLE 9-continued

| No. | C ppm | Si × 10−3 % | Mn × 10−3 % | P × 10−3 % | S ppm | Al × 10−3 % | N ppm | Ti × 10−3 % | B ppm | Free N* ppm | TiN** Form | Remarks |
|---|---|---|---|---|---|---|---|---|---|---|---|---|

*Free N: total N - Ti/3.42
**TiN form: (a) 0.05 μm ≦ TiN size ≦ 10 μm was at least 50% of the tatal amount (b) 10 μm < TiN size was at least 50% of the total amount (c) TiN size < 0.05 μm was at least 50% of the total amount
The underline represents the portions outside the range of the present invention

TABLE 10

| | Processing Condition | | | | | | | |
|---|---|---|---|---|---|---|---|---|
| | Hot Rolling Condition | | | Cold Rolling Condition | | | | |
| No. | Slab Heating Temp. °C. | Winding Temp. °C. | Thickness of Hot Rolled Sheet mm | Reduction Ratio % | Thickness of cold rolled sheet mm | Annealing Condition System | Annealing Condition Cycle | Skin Pass Rolling % | Surface Treatment |
| 24 | 1150 | 750 | 3.5 | 77 | 0.8 | Con. | 810° C. × 1 min. | 1.0 | GI |
| 25 | 1150 | 550 | 3.5 | 77 | 0.8 | Con. | 810° C. × 1 min. | 1.0 | GI |

| | Properties | | | | |
|---|---|---|---|---|---|
| No. | Yield strength kgf/mm² | Tensile strength kgf/mm² | Elongation % | r̄ Value | This invention or Comp. Example |
| 24 | 24.4 | 34.1 | 41 | 1.69 | This invention |
| 25 | 25.0 | 34.7 | 38 | 1.66 | This invention |

Annealing System
Con.: Continuous annealing
Box: Box Annealing
Surface Treatment
GI: molten zinc plating Example 6

Steels having the components shown in Table 11 were hot rolled, cold rolled and annealed under the condition tabulated in Table 12, and electrotinning was carried out. Properties obtained in these cases were also tabulated in Table 12.

The steel sheets according to the present invention also exhibited here excellent properties as a steel sheet for a tin plate.

TABLE 11

| No. | C ppm | Si × 10−3 % | Mn × 10−3 % | P × 10−3 % | S ppm | Al × 10−3 % | N ppm | Ti × 10−3 % | Free N* ppm | TiN** Form | Remarks |
|---|---|---|---|---|---|---|---|---|---|---|---|
| 26 | 488 | 10 | 258 | 17 | 110 | 52 | 117 | 28 | 35 | a | This invention |
| 27 | 488 | 10 | 258 | 17 | 110 | 52 | 117 | — | 117 | a | Comp. Example |
| 28 | 488 | 10 | 258 | 17 | 110 | 52 | 117 | 23 | 50 | a | This invention |
| 29 | 488 | 10 | 258 | 17 | 110 | 52 | 117 | — | 117 | a | Comp. Example |

*Free N: total N - Ti/3.42
**TiN form: (a) 0.05 μm ≦ TiN size ≦ 10 μm was at least 50% of the tatal amount (b) 10 μm < TiN size was at least 50% of the total amount (c) TiN size <0.05 μm was at least 50% of the total amount
The underline represents the portions outside the range of the present invention

TABLE 12

| | Hot Rolling Condition | | | Cold Rolling Condition | | | | Skin Pass roll-ing % | Surface Treat-ment | Properties | | This invention or Comp. Example |
|---|---|---|---|---|---|---|---|---|---|---|---|---|
| No. | Slab Heating Temp. °C. | Winding Temp. °C. | Thickness of Hot Rolled Sheet mm | Reduc-tion ratio % | Thickness of clod rolled sheet mm | Annealing Condition System | Cycle | | | Hard-ness | Degree of Temper | |
| 26 | 1235 | 550 | 3.0 | 90 | 0.3 | Box | 650° C. × 8 H | 1.3 | ET | 49 | T-1 | This invention |
| 27 | 1235 | 550 | 3.0 | 90 | 0.3 | Box | 650° C. × 8 H | 1.3 | ET | 56 | T-1 | Comp. Example |
| 28 | 1235 | 550 | 3.0 | 90 | 0.3 | Con. | 650° C. × 20 sec. | 1.3 | ET | 61 | T-4 | This invention |
| 29 | 1235 | 550 | 3.0 | 90 | 0.3 | Con. | 650° C. × 20 sec. | 1.3 | ET | 68 | T-4 | Comp. Example |

*refining rolling: reduction ratio 1.3%
**hardness: rockwell hardness (HR30T)

Example 7

Steels having the components shown in Table 13 were hot rolled, cold rolled and annealed under the condition tabulated in Table 14. Properties obtained in these cases were also tabulated in Table 14.

Even when those elements which were unavoidably contained in the scrap, such as Sn, Cr, Ni, etc., were contained, the effect of the present invention was not at all deteriorated.

In other words, excellent formability could be obtained when the basic components, the quantity of TiN and its form were within the ranges of the present invention.

TABLE 13

| NO. | C ppm | Si × $10^{-3}$ % | Mn × $10^{-3}$ % | P × $10^{-3}$ % | S ppm | Al × $10^{-3}$ % | N ppm | Ti × $10^{-3}$ % | B ppm | Free N* ppm | TiN** form | Cu % | Ni % | Cr % | As % | Sn % | Mo % | Remarks |
|---|---|---|---|---|---|---|---|---|---|---|---|---|---|---|---|---|---|---|
| 30 | 302 | 9 | 163 | 5 | 118 | 32 | 122 | 29 | — | 37 | a | 0.016 | 0.026 | 0.015 | — | — | — | This invention |
| 31 | 415 | 8 | 170 | 6 | 135 | 70 | 90 | 0 | — | 90 | a | — | — | — | — | — | — | Comp. Example |
| 32 | 432 | 9 | 237 | 19 | 125 | 35 | 111 | 31 | — | 20 | a | 0.10 | 0.04 | 0.08 | 0.04 | 0.04 | 0.05 | This invention |
| 33 | 302 | 9 | 163 | 5 | 118 | 35 | 122 | 29 | — | 37 | a | 0.09 | 0.19 | 0.19 | 0.05 | 0.04 | 0.06 | This invention |
| 34 | 401 | 9 | 165 | 6 | 121 | 35 | 118 | 29 | — | 37 | <u>b</u> | 0.015 | 0.024 | 0.024 | — | — | — | Comp. Example |
| 35 | 415 | 9 | 165 | 6 | 121 | 32 | 118 | 29 | — | 33 | <u>c</u> | 0.015 | 0.024 | 0.024 | — | — | — | Comp. Example |

*Free N: total N - Ti/3.42
**TiN form: (a) 0.05 μm ≦ TiN size ≦10 μm was at least 50% of the tatal amount (b) 10 μm < TiN size was at least 50% of the total amount (c) TiN size <0.05 μm was at least 50% of the total amount
The underline represents the portions outside the range of the present invention

TABLE 14

| | Hot Rolling Condition | | | Cold Rolling Condition | | | | Skin Pass Roll-ing % | Sur-face Treat ment |
|---|---|---|---|---|---|---|---|---|---|
| No. | Slab Heating Temp. °C. | Winding Temp. °C. | Thickness of Hot Rolled Sheet mm | reduc-tion Ratio % | Thickness of cold rolled sheet mm | Annealing Condition System | Cycle | | |
| 30 | 1250 | 550 | 3.0 | 73 | 0.8 | Box | 680° C. × 14 H | 1.2 | |

TABLE 14-continued

| | | | | | | | | | |
|---|---|---|---|---|---|---|---|---|---|
| 31 | 1250 | 550 | 3.0 | 73 | 0.8 | Box | 680° C. × 14 H | 1.2 | — |
| 32 | 1150 | 750 | 3.5 | 77 | 0.8 | Con. | 810° C. × 1 min. | 1.0 | — |
| 33 | 1250 | 550 | 3.0 | 73 | 0.8 | Box | 680° C. × 14 H | 1.2 | — |
| 34 | 1250 | 550 | 3.0 | 73 | 0.8 | Box | 680° C. × 14 H | 1.2 | — |
| 35 | 1250 | 550 | 3.0 | 73 | 0.8 | Box | 680° C. × 14 H | 1.2 | — |

| | Properties | | | | |
|---|---|---|---|---|---|
| No. | Yield strength kgf/mm$^2$ | Tensile strength kgf/mm$^2$ | Elongation % | r value | This invention or Comp. Example |
| 30 | 17.1 | 31.0 | 46 | 1.81 | This invention |
| 31 | 19.7 | 33.4 | 38 | 1.52 | Comp. Example |
| 32 | 18.1 | 32.8 | 44 | 1.68 | This invention |
| 33 | 17.8 | 32.4 | 44 | 1.70 | This invention |
| 34 | 17.5 | 32.8 | 42 | 1.66 | Comp. Example |
| 35 | 25.4 | 32.4 | 36 | 1.39 | Comp. Example |

Annealing System
Con.: Continuous annealing
Box: Box annealing

INDUSTRIAL APPLICABILITY

The present invention can make N harmless where N unavoidably attains a high level when a scrap is reutilized, and can obtain a cold rolled steel sheet having high formability irrespective of a high N content.

The cold rolled steel sheet according to the present invention can be utilized not only as the cold rolled steel sheet but also as a raw sheet for a surface treated steel sheet such as a molten zinc plated steel sheet, an electrogalvanized steel sheet, an electrotin plated steel sheet, and so forth. Accordingly, the present invention has an extremely great industrial value.

We claim:

1. A cold rolled steel sheet having excellent formability and comprising not greater than 0.1 wt % of C, 0.0060 to 0.0150 wt % of N, not greater than 0.4 wt % of Mn (within the range satisfying the relation Mn/S≧7), not greater than 0.030 wt % of S, 0.005 to 0.1% of Al, not greater than 0.08 wt % of Ti (within the range satisfying the relation (N (%)—Ti/3.42 (%))≦0.0070%), and the balance consisting of Fe and unavoidable impurities, wherein TiN having a size of 0.05 to 10 μm is precipitated in a weight of at least ½ of the total TiN weight.

2. A cold rolled steel sheet according to claim 1, wherein the Ti content is within the range satisfying the relation N (%)—Ti/3.42 (%)≦0.0040%.

3. A cold rolled steel sheet according to claim 1, wherein the Ti content is within the range satisfying the relation 0.0020%≦N (%)—Ti/3.42 (%)≦0.0070%.

4. A cold rolled steel sheet according to claim 2, which further contains B in an amount satisfying the relation 1.0≦1.3×B (%)/(N (%)—Ti (%)/3.42)≦1.5.

5. A production method of a cold rolled steel sheet having excellent formability by casting a molten steel comprising not greater than 0.1 wt % of C, 0.0060 to 0.0150 wt % of N, not greater than 0.4 wt % of Mn (within the range satisfying the relation Mn/S≧7), not greater than 0.03 wt % of S, 0.005 to 0.1 wt % of Al, not greater than 0.08 wt % of Ti (within the range satisfying the relation (N (%)—Ti/3.42 (%))≦0.0040%), and the balance consisting of Fe and unavoidable impurities, said method comprising:

cooling a resulting slab at a cooling rate of 10° to 50° C./min within the temperature range of a solidifying point to 600° C. so as to precipitate TiN having a size of 0.05 to 10 μm in a weight of at least ½ of the total TiN weight in the resulting slab;

heating the slab;

hot rolling the slab;

winding a resulting hot rolled steel strip at a temperature of at least 700° C.;

cold rolling the hot rolled steel strip; and effecting then continuous annealing.

6. A production method of a cold rolled steel sheet having excellent formability, by casting a molten steel comprising not greater than 0.1 wt % of C, 0.0060 to 0.0150 wt % of N, not greater than 0.4 wt % of Mn (within the range satisfying the relation Mn/S≧7), not greater than 0.03 wt % of S, 0.005 to 0.1 wt % of Al, not greater than 0.08 wt % of Ti (within the range satisfying the relation (N (%)—Ti/3.42 (%))≦0.0040%), B in an amount satisfying the relation 1.0≦1.3×B (%)/(N (%)—Ti (%)/3.42)≦1.5 and the balance consisting of Fe and unavoidable impurities, said method comprising:

cooling a resulting slab at a cooling rate of 10° to 50° C./min within the temperature range of a solidifying point to 600° C. so as to precipitate TiN having a size of 0.05 to 10 μm in a weight of at least ½ of the total TiN weight in the resulting slab;

heating the slab;

hot rolling the slab;

winding a resulting hot rolled steel strip;

cold rolling the hot rolled steel strip; and effecting then continuous annealing.

7. A production method of a cold rolled steel sheet having excellent formability, by casting a molten steel comprising not greater than 0.1 wt % of C, 0.0060 to 0.0150 wt % of N, not greater than 0.4 wt % of Mn (within the range satisfying the relation Mn/S≧7), not greater than 0.030 wt % of S, 0.005 to 0.1 wt % of Al, not greater than 0.08 wt % of Ti (within the range satisfying the relation 0.0020 wt %≦N (%)—Ti/3.42 (%)≦0.0070%), and the balance consisting of Fe and unavoidable impurities, said method comprising:

cooling a resulting slab at a cooling rate of 10° to 50° C./min within a temperature range of a solidifying point to 600° C. so as to precipitate TiN having a size of 0.05 to 10 μm in a weight of at least ½ of the TiN total weight inside the resulting slab;

heating the slab to a temperature of not lower than 1,130° C.;

hot rolling the slab;

winding a resulting hot rolled steel strip within a temperature range of not higher than 650° C.;

cold rolling the hot rolled steel strip; and effecting then box annealing.

* * * * *

UNITED STATES PATENT AND TRADEMARK OFFICE
CERTIFICATE OF CORRECTION

PATENT NO. : 5,558,726
DATED : September 24, 1996
INVENTOR(S) : Hisayoshi YATOH, et al.

It is certified that error appears in the above-indentified patent and that said Letters Patent is hereby corrected as shown below:

Column 19, line 49, change dash to hyphen.

Column 19, line 55, change dash to hyphen.

Column 19, line 58, change dash to hyphen.

Colum 19, line 62, change dash to hyphen.

Column 20, line 30, change dash to hyphen.

Column 20, line 51, change dash to hyphen.

Column 20, line 53, change dash to hyphen.

Column 21, line 7, change "%≦N" to --%≦(N--.

Column 21, line 8, change dash to hyphen.

Signed and Sealed this

Eighth Day of July, 1997

Attest:

BRUCE LEHMAN

Attesting Officer

Commissioner of Patents and Trademarks